United States Patent [19]

Provenson

[11] Patent Number: 5,020,960
[45] Date of Patent: Jun. 4, 1991

[54] BOAT HAUL VEHICLE

[75] Inventor: Victor A. Provenson, Woodstock, Ga.

[73] Assignee: Auto Transport Equipment Co., Kennesaw, Ga.

[21] Appl. No.: 512,340

[22] Filed: Apr. 23, 1990

[51] Int. Cl.⁵ .................. B60P 3/08; B60R 9/00; B62D 39/00
[52] U.S. Cl. .................... 414/494; 414/500; 414/538; 410/26; 410/27; 410/29.1; 280/414.2
[58] Field of Search ............ 414/494, 495, 500, 537, 414/538, 559; 280/414.1, 414.2, 476.1; 410/4, 24, 24.1, 26, 27, 28, 28.1, 29.1; 14/71.1, 71.3, 71.7, 69.5

[56] References Cited

U.S. PATENT DOCUMENTS

| 2,492,829 | 12/1949 | Baker | 410/28.1 X |
|---|---|---|---|
| 2,695,568 | 11/1954 | Keith | 410/27 |
| 2,730,400 | 1/1956 | Franics | 296/1 |
| 2,993,725 | 7/1961 | Kevren | 410/24.1 |
| 3,084,970 | 4/1963 | Day | 410/29.1 |
| 3,104,127 | 9/1963 | Swartzwelder | 410/24.1 X |
| 3,343,865 | 9/1967 | Stuart | 296/1 |
| 3,372,817 | 3/1968 | Conklin | 414/500 X |
| 3,480,166 | 11/1969 | Abbott | 414/538 X |
| 3,589,767 | 6/1971 | Stuart | 410/24.1 |
| 3,679,080 | 7/1972 | Fulcher | 414/538 X |
| 3,809,266 | 5/1974 | Salerni | 414/538 X |
| 3,814,464 | 6/1974 | Wardill et al. | 280/476.1 |
| 3,840,133 | 10/1974 | Berg | 414/537 X |
| 3,880,457 | 4/1975 | Jones, Jr. | 410/28.1 X |
| 4,068,772 | 1/1978 | Prudhomme | |
| 4,081,196 | 3/1978 | Dandridge, Jr. | 410/24.1 X |
| 4,172,612 | 10/1979 | Kinard | 410/24.1 X |
| 4,369,008 | 1/1983 | Cooper | 410/24.1 X |
| 4,420,165 | 12/1983 | Goodin | 280/414.1 |
| 4,507,016 | 3/1985 | Honour, VII | 280/414.1 |
| 4,560,316 | 12/1985 | Daniels | 414/481 |
| 4,705,289 | 11/1987 | Weber | 280/414.1 |
| 4,715,769 | 12/1987 | Kirtley | 414/538 X |
| 4,750,856 | 6/1988 | Lapiolahti | 414/563 |
| 4,795,303 | 1/1989 | Bubik | 414/478 |
| 4,802,685 | 2/1989 | Godbersen | 280/414.1 |
| 4,880,250 | 11/1989 | Cravens et al. | 280/414.1 |
| 4,881,859 | 11/1989 | Ehrlich | 410/29.1 |

FOREIGN PATENT DOCUMENTS

| 1902949 | 8/1970 | Fed. Rep. of Germany | 280/414.1 |
|---|---|---|---|
| 2233124 | 1/1974 | Fed. Rep. of Germany | 414/494 |
| 2532895 | 3/1984 | France | 414/559 |

Primary Examiner—Robert J. Spar
Assistant Examiner—Robert S. Katz
Attorney, Agent, or Firm—Thomas, Kerr & Kayden

[57] ABSTRACT

A boat haul vehicle (10) includes lower and upper tiers of adjustable ramps (20-25) and skids (48), (50) and (51), and the ramps and skids include tracks (76). Dollies (55) are mounted to the front portion of each boat trailer, and the track wheels (75) of each dolly have a peripheral shape that is compatible with the tracks (76) mounted on each ramps and skid. Winches (91-94) are connectable to the boat trailers so as to progressively pull each boat and its trailer onto or off of the boat haul vehicle, with the track wheels (75) guiding the front of each trailer on the tracks (76).

10 Claims, 3 Drawing Sheets

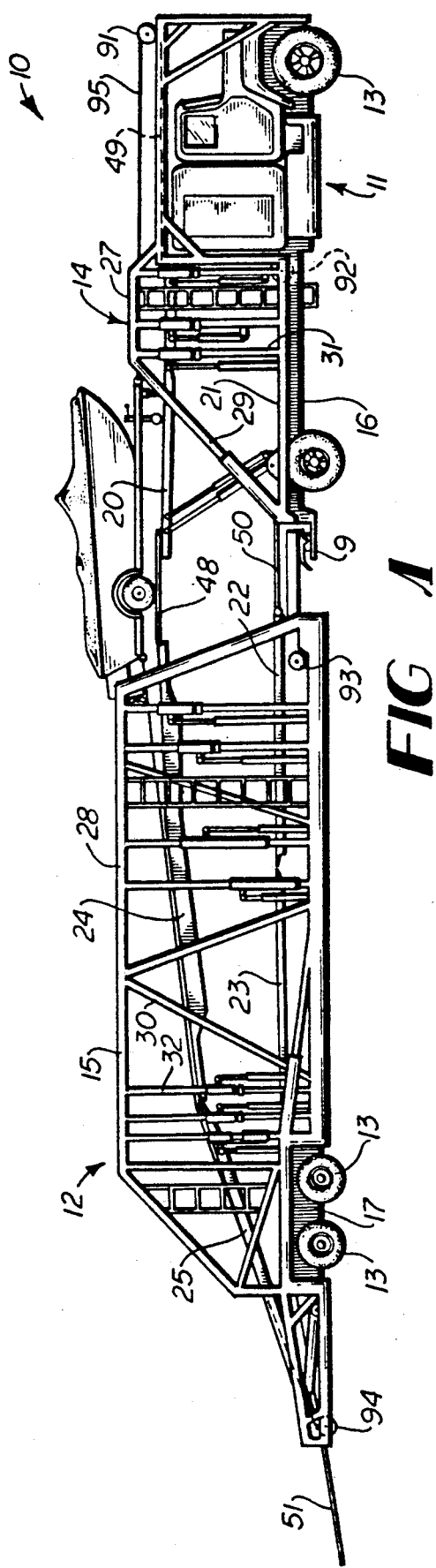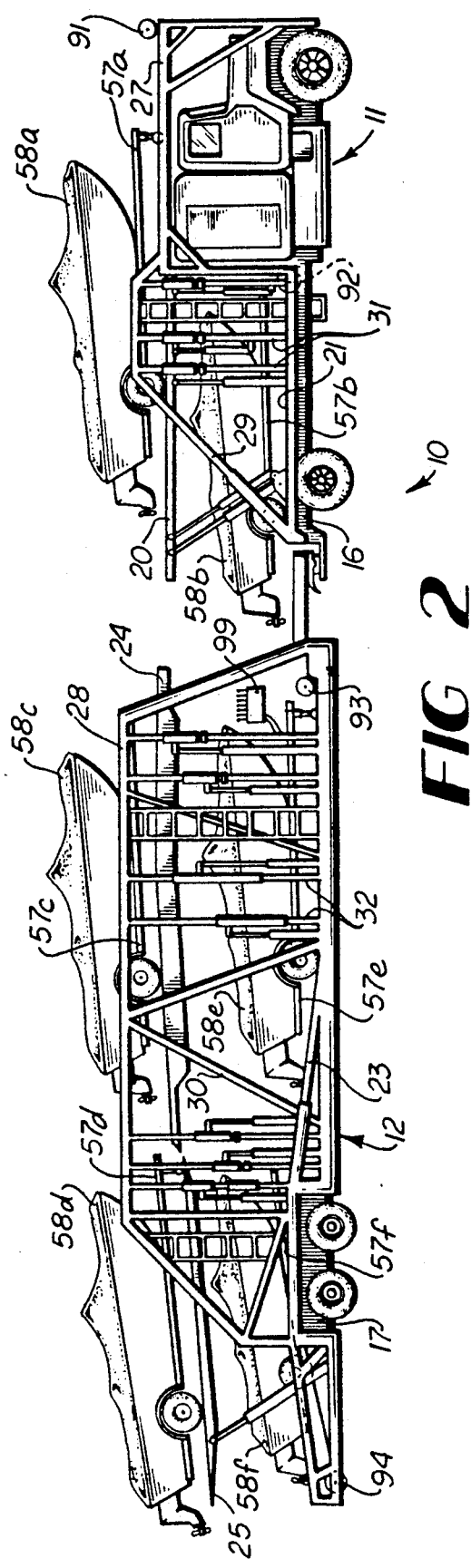

BOAT HAUL VEHICLE

FIELD OF THE INVENTION

The invention disclosed herein relates to a load carrying vehicle for carrying a plurality of wheel-mounted objects in multiple layers. More particularly, the invention relates to a boat haul vehicle that loads and carries boats which are mounted on their individual trailers, with the boats and their trailers arranged in multiple layers. The boat haul vehicle includes alignable ramps that allow the boats and their trailers to be rolled on and rolled off of the ramps during loading and unloading.

BACKGROUND OF THE INVENTION

In the boat production industry, it has been the custom to deliver the boats to the boat dealers by loading the boats on boat haul vehicles. The boat trailers which are usually sold with the boats are delivered separately. Typically, the boats are aligned parallel to one another on the boat haul vehicle, usually with the boats being inclined with their bows raised upwardly so as to make maximum usage of the space within the load carrying space of the vehicle.

When the boats are delivered to the dealer, usually the dealer is required to have a crane that will lift each boat from the boat haul vehicle. Further, the dealer usually provides a boat trailer for each boat so that the crane can sit each boat on its trailer during the unloading process. If the boat trailers are not available or are the wrong size, etc., the dealer might have to place the boats on the ground or on the wrong trailers. Further, if an outboard engine is to be mounted to the boat, the dealer typically must select an engine suitable for the boat and mount the engine to the boat.

In other arrangements of hauling boats from the boat manufacturer to the dealer, boats are mounted on their individual trailers at the manufacturing site and the boats and trailers are lifted by a crane and placed on a boat haul vehicle. Sometimes the trailer wheels of the boat trailers are removed so as to make a more compact load of the boats and their trailers on the boat haul vehicle. When delivered, the dealer must use a crane to remove the boats from the boat haul vehicle and re-mount the wheels on the boat trailers.

In either of the above described processes of loading and unloading boats on a boat haul vehicle a substantial amount of time, equipment and manpower is required. The boats must be carefully placed on, supported on and removed from the boat haul vehicle to avoid damage to the boats. Also, only a few boats can be transported at a time.

Thus, it can be seen that it would be desirable to provide an efficient and versatile boat haul trailer to haul several boats already mounted on their respective trailers from the site of the boat manufacturer to the dealer, so that each boat and its trailer can be rolled on and rolled off the boat haul trailer with its own trailer wheels used to move the boats and without requiring the use of a crane to lift the boats.

SUMMARY OF THE INVENTION

Briefly described the present invention comprises a load carrying vehicle for carrying a plurality of wheel-mounted objects in multiple layers on highways, with means for loading and off loading the wheel-mounted objects at both pickup and delivery points without requiring cranes. The wheel-mounted objects that are to be hauled can include, for example, boats already mounted on their boat trailers, with the boats selectively including their built-in engines or removably attached outboard engines.

The load carrying vehicle, hereinafter referred to as a "boat haul vehicle", includes a plurality of adjustable ramps extending along the length of the vehicle, and hydraulic cylinders or other ramp power means for raising and lowering the ramps, so as to align the ramps for loading and unloading of the boats and their trailers, and for adjusting the levels of the ramps so as to form a compact load during transport of the boats and trailers.

Further, a dolly is provided for the front of each boat trailer so as to provide spaced apart front wheels for the boat trailer, with the front wheels of the trailers being shaped to ride upon tracks mounted on the ramps of the boat haul vehicle. The tracks of each ramp are arranged so as to become aligned with one another when the ramps are aligned with one another, so that the adjacent tracks form an effectively continuous track from ramp-to-ramp through the boat haul vehicle.

Winches are provided at several locations throughout the boat haul vehicle for the purpose of pulling the boats and trailers on and off of the boat haul vehicle. For example, a winch at the forward portion of the vehicle can have its cable connected to the front of a boat trailer and, once the ramps are aligned, the winch can pull the boat and trailer from a position behind the vehicle onto the aligned ramps of the vehicle until the boat and trailer are properly positioned in its space of the vehicle. In the meantime, a winch at the rear of the boat haul vehicle is connected to the rear of the boat trailer and functions as a brake to prevent the boat and trailer from lurching forwardly and to otherwise control the movement of the boat and trailer as the boat and trailer are pulled forwardly on the ramps of the vehicle. Likewise, the rear winch can be used to pull the boat and trailer rearwardly and off of the boat haul vehicle while the forwardly placed winch is used to brake and otherwise control the rearward movement of the boat and trailer as it moves off the boat haul vehicle.

Thus, it is an object of this invention to provide a load carrying vehicle for carrying a plurality of wheel-mounted objects, such as boats mounted on trailers, in multiple layers, with the load carrying vehicle providing tracks or other guide means for guiding the wheels of the trailers as the trailers move on and off of the load carrying vehicle.

Another object of the invention is to provide a boat haul vehicle which carries boats or other objects mounted on their individual trailers, and which can be economically and expediently and safely loaded and unloaded and transported from load site to delivery site.

Another object of this invention is to provide a unique ramp system for a multiple layer load carrying vehicle which provides a guidance means for guiding a wheeled vehicle onto a load carrying vehicle without requiring operator assistance.

Another object of this invention is to provide a track and dolly combination for use in guiding trailer vehicles into a load carrying vehicle, whereby dollies are mounted to the front of each trailer and the dollies engage the track provided on the load carrying vehicle so as to guide the trailers on and off of the load carrying vehicle.

Other objects, features and advantages of the present invention will become apparent upon reading the following specification, when take in conjunction with the accompanying drawings.

BRIEF DESCRIPTION OF THE DRAWINGS

FIG. 1 is a side elevational view of the load carrying vehicle, showing the ramps of the vehicle arranged for loading the upper tier of its load, and showing how a boat and its trailer are rolled on the vehicle.

FIG. 2 is a side elevational view, similar to FIG. 2, but showing the ramps of the load carrying vehicle arranged in the transport configuration, with boats and trailers mounted on the ramps.

DETAILED DESCRIPTION

Figure 3:
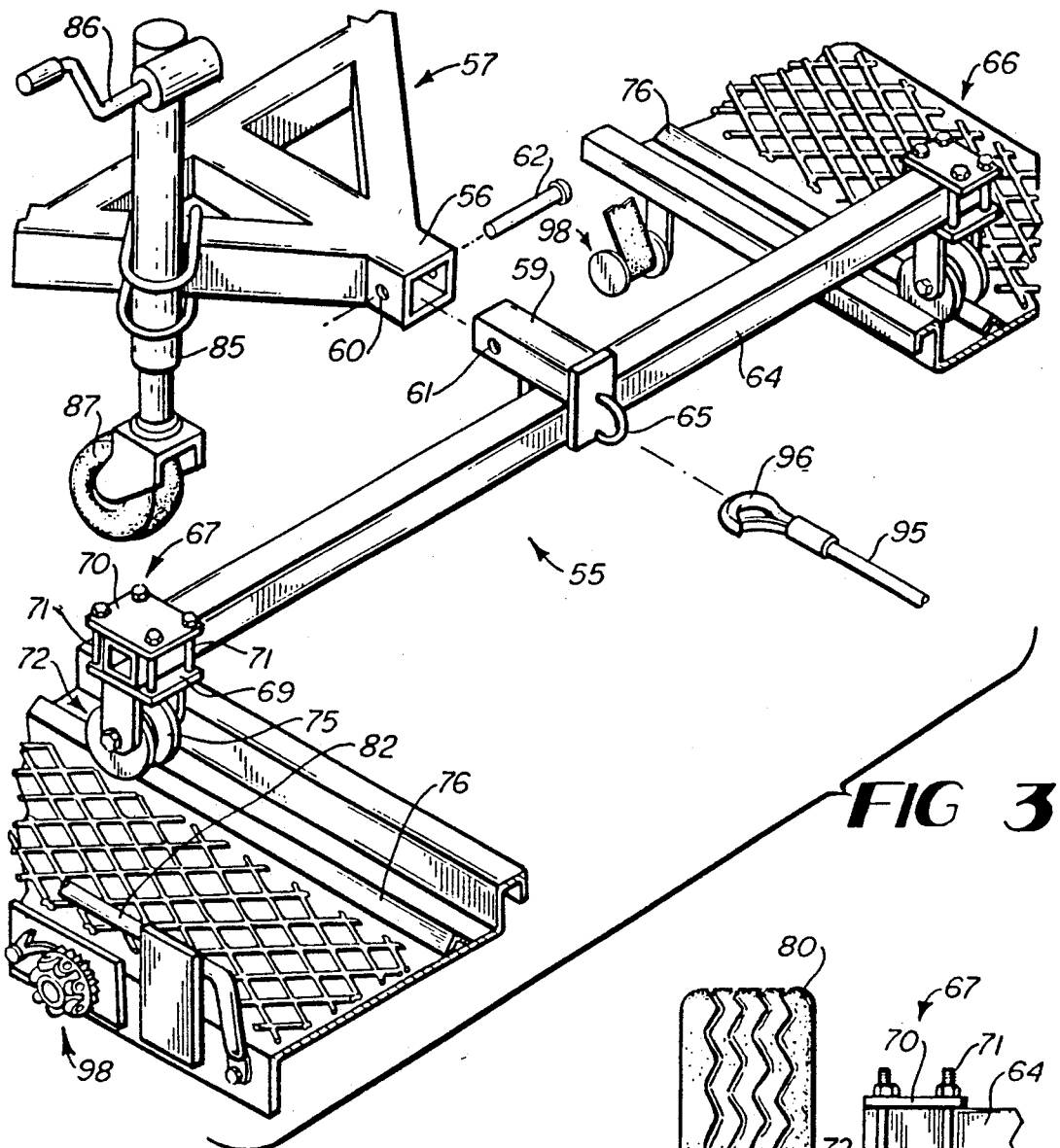
FIG. 3 is an exploded perspective illustration of the dolly and the front end of a boat trailer, showing how the wheels of the dolly engage the tracks of the ramps of the load carrying vehicle.

Referring now in more detail to the drawings, in which like numerals indicate like parts throughout the several views, FIG. 1 illustrates the load carrying vehicle 10 which includes a tractor 11 and trailer 12 each mounted on road wheels 13 and connected together by a conventional fifth wheel connection 9. Both the tractor and trailer are constructed with side frames, such as side frame 14 of tractor 11 mounted on a chassis 16 and side frame 15 of trailer 12 mounted on a chassis 17. The side frames of the tractor are arranged in side-by-side, spaced parallel relationship at the sides of the tractor so as to form a load carrying space therebetween, and the side frames 15 of the trailer are likewise situated side-by-side, spaced parallel relationship at the sides of the trailer to define a similar load carrying space. FIGS. 1 and 2 are side views and therefore have been drawn to illustrate only the adjacent side frame and the ramps next to the adjacent side frame; however, it will be understood that the side frames of each of the tractor and trailer are substantially duplicates of one another and that the ramps to be described hereinafter are arranged in pairs with each ramp of each pair used to support the wheels on one side of the boat trailers.

A plurality of adjustable ramps 20-25 are supported by the side frames 14 and 15 of the vehicle. The side frames 14 and 15 include longitudinally extending upper support bars 27 and 28, several strengthening diagonally extending support bars 29 and 30, and a plurality of vertically oriented ramp support bars 31 for tractor 11 and 32 for trailer 12.

Figure 5:
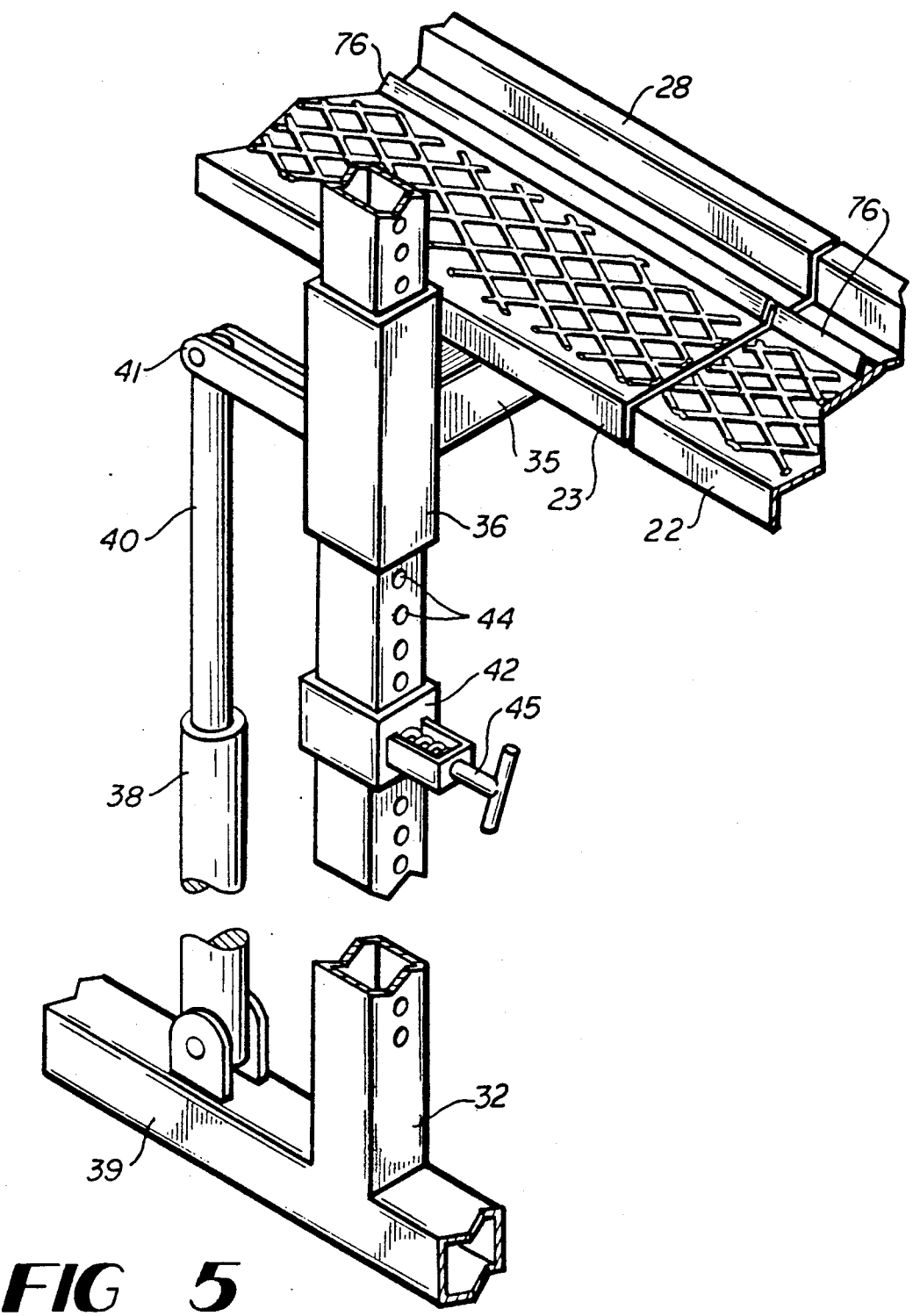
FIG. 5 is a perspective illustration of a vertical support post, the hydraulic cylinder, the movable sleeve and the collar, all of which are part of a side frame of the load carrying vehicle.

As illustrated in FIG. 5, the ramps, such as ramps 23, are supported on vertical ramp support bars 32 by means of a cross beam 35 extending from one side frame to the other across the load space of the vehicle, and with the ends of the cross beam 35 mounted to movable ramp support collars 36. The support collars 36 each surround a vertical ramp support bar 32. Hydraulic cylinder 38 is mounted on the lower chassis portion 39 of the vehicle and its cylinder rod 40 is connected to the movable ramp support collar 36 by clevis 41. When the cylinder rods 40 are distended and retracted, the ramps 23 will be carried vertically by the cross beam 35.

Lock collars 42 are slidably mounted about the vertical ramp support bars 32. The vertical ramp support bars 32 include a series of holes 44 formed therein, and lock collars 42 each include a spring urged plunger 45 that will seat itself in one of the holes 44, thereby locking the lock collar 42 to a fixed position on the vertical ramp support bar 32. When lock collars 42 have been locked in place, a ramp 28 can be lowered by its hydraulic cylinders 38 until the ramp support collars 36 rest on lock collars 42. This takes the load off the hydraulic cylinders 38 when the ramps have been loaded with boats and trailers and the load is properly positioned for travel, etc.

FIG. 1 illustrates the ramps 20-25 located in aligned arrangement whereby the upper tier of ramps is ready to be loaded with boats and trailers or other wheel-mounted objects. Ramps 25 have their rear portions in their lowermost position and are sloped upwardly toward ramps 24, and ramps 24 are located more horizontally. The jumper skids 48 are manually placed so as to extend from the front of ramps 24 to the rear of ramps 20 so as to form a bridge from ramps 24 to ramps 20. Ramp 20 is aligned with the stationary ramp 49 over the cab of the tractor.

Likewise, the lower tier of ramps 21-23 are arranged so that their end portions are generally aligned. Jumper skids 50 are manually placed so as to bridge the space between the forward ends of ramps 22 and the rearward ends of ramps 21. Jumper skids 48 and 50 are manually installed during loading and unloading, but are removed and stored on the vehicle for travel.

Loading skids 51 are located at the rear of the vehicle and mount adjacent the rear end of inclined ramp 25, so as to provide the initial upwardly sloped surfaces for the boats and trailers as they begin to be moved onto the load carrying vehicle 10. The loading skids 51 also are hand positioned and are removed and stored on the vehicle when the vehicle has been properly loaded.

After the boats have been placed on the upper tier of ramps 49, 20, 24 and 25, these ramps are raised to their full upward positions, thereby opening the lower tier of ramps for loading. Once the boats and trailers have been moved into the loading space and onto the lower tier of ramps 21-23, the lower ramps will be lowered or otherwise adjusted so as to place the boats and trailers in their proper travel positions, and then the upper tier of ramps will be adjusted to move their boats and trailers downwardly so as to make the load as compact as possible. The jumper skids 48 and 50 and loading skids 51 are removed and stored in the vehicle. Tie downs 98 are used to tie the trailer of each boat/trailer combination to the ramps of the load carrying vehicle.

The boats 58 and trailers 57 to be carried by the boat haul trailer generally are of conventional design, and can vary in length and width dimensions. Obviously, the boats and trailers must be narrower than the spaces between the side frames of the vehicle unless the boats and trailers are mounted on the upper tier of ramps where the side frames of the vehicle do not obstruct wider boats. FIG. 2 illustrates six boats mounted on a boat haul vehicle; however, it will be understood that larger and smaller boats/trailers can be hauled and therefore different numbers and arrangements of boats and trailers can be hauled.

As illustrated in FIG. 3, a dolly 55 is mounted to the front portion or yoke 56 of the boat trailer 57. The yoke 56 of the boat trailer is formed of hollow, rectangular tubing, and the socket (not shown) of the typical boat trailer hitch is mountable to the yoke 56, by sliding the socket assembly into the opening of the yoke 56. Dolly 55 includes a longitudinally extending mounting bar 59 for insertion into the yoke 56. Openings 60 in the yoke and 61 in the mounting bar become aligned as the mounting bar 59 is inserted into yoke 56, and a connector pin or other fastener 62 is inserted through the aligned openings to rigidly connect the dolly 55 to the trailer 57.

Figure 4:
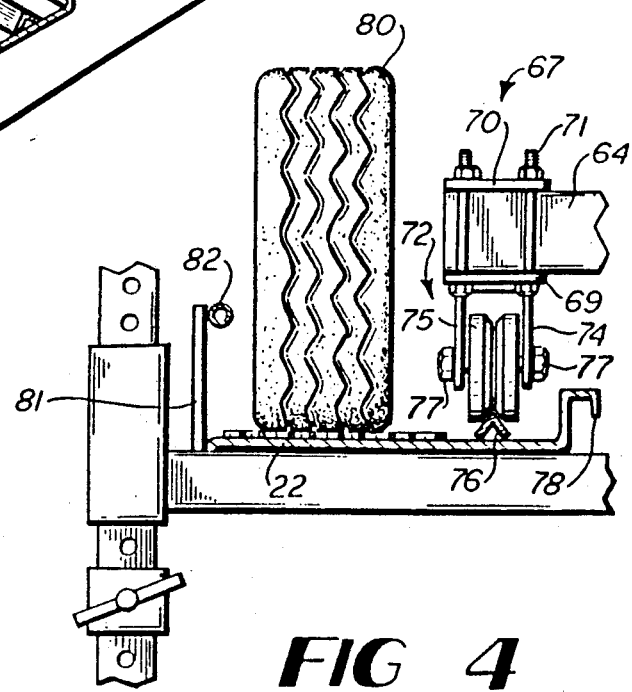
FIG. 4 is a front view of a detail of the load carrying vehicle, showing an end portion of the dolly and one of its track wheels, a ramp of the load carrying vehicle showing a track for the track wheel of the dolly, and a portion of the side frame of the load carrying vehicle, illustrating the movable connection of the ramps with respect to the side frame of the load carrying vehicle.

Dolly 55 includes a cross bar 64 rigidly mounted intermediate its ends to mounting bar 59. Bullnose hook 65 is located intermediate the ends of cross bar 64, and track wheel assemblies 66 and 67 are mounted on the ends of the cross bar 64. Each track wheel assembly includes lower and upper mounting plates 69 and 70, fasteners 71 which rigidly hold the mounting plates to the ends of the cross bar 64, and wheel assemblies 72 are mounted to the lower plate 70. As shown in FIG. 4, each wheel assembly includes a wheel support clevis 74, wheel 75 and axle 77 extending through the wheel and the side plates of the clevis.

As best illustrated in FIG. 4, the peripheral surface of each track wheel 75 is V-shaped in cross section so as to include a V-shaped circumferential surface. The track wheels 75 at the ends of dolly 55 are arranged to ride on tracks 76 that are mounted on the ramps, such as ramps 20-25, 49 and skids 48, 50 and 51 of the boat haul vehicle. FIG. 4 illustrates a ramp 22 which extends along the length of the trailer 12 in the lower tier of ramps, and track 76 also extends longitudinally of the trailer. The track wheel assemblies 66 and 67 at the ends of cross bar 64 are spaced apart distances that correspond to the spacing apart of the tracks 76 of a pair of ramps, so that the track wheels 75 will always properly ride on the tracks 76. The tracks 76 are shaped in cross section as inverted V's, which is a shape that corresponds to the circumferential surface of the track wheel 75.

The tracks 76 are placed adjacent the inner edges 78 of the ramps 22, and the road wheels 80 of the boat trailer are spaced apart greater distances than the spacing of the track wheels 75 so that the road wheels will ride on the ramps 22 outside of the tracks 76.

The outer edges 81 of the ramps 22 have mounted thereon guide fenders 82 that are located outboard of the road wheels 80 of the boat trailer. The fenders 82 function to engage the road wheels 80 of the trailer if the road wheels tend to wander laterally toward an outer edge 81 of the ramps 22, thereby confining the road wheels 80 to the ramps.

As illustrated in FIG. 3, a jack 85 typically is provided at the front of each trailer 57, and its crank 86 can be rotated to raise and lower the front of the trailer.

As illustrated in FIGS. 1 and 2, winches 91, 92, 93 and 94 are positioned along the centerline of the boat haul vehicle, with winch 91 mounted at the upper front of the tractor 11, winch 92 mounted behind the cab and at the lower level of the tractor, winch 93 mounted in the lower forward level of the trailer 12, and winch 94 mounted at the lower tail portion of the trailer. As shown in FIG. 3, each winch includes a cable 95 and a winch hook 96 at the end of the cable, and the winch hook is connectable to the bullnose 65 of dolly 55. Otherwise, the cable can be wrapped around any portion of the trailer 57 of the boat with the hook 96 attached back to the cable 95 so as to connect to the trailer.

When the boats and trailers are to be loaded on the boat haul vehicle, the ramps 20-25 are adjusted by moving the control valves 99 (FIG. 2) that control the movement of hydraulic fluid to the hydraulic cylinders 38, so that the ends of the ramps are aligned with one another (FIG. 5). When the ends of the ramps are aligned, the tracks 76 of the ramps also will be aligned, with only small gaps being formed between the ends of the ramps and tracks, so as to provide an effectively continuous track from ramp to ramp, and to provide an effectively continuous ramp from one ramp to the next ramp. Skids 48 are placed between ramps 20 and 24, while skids 50 are placed between ramps 21 and 22. Likewise, loading skids 51 are connected to the chassis of the vehicle adjacent ramps 25. Skids 40, 50 and 51 all include tracks 76 of the type illustrated in FIGS. 3-5, so that a continuous track can be formed in each of the upper and lower tiers of the loading space of the boat haul vehicle.

When the boats and trailers are to be loaded onto the boat haul vehicle, the cable from winch 91 will be paid out along the entire upper tier of ramps, down to loading skid 51. As shown in FIG. 3, a dolly 55 will be connected to the yoke 56 of a trailer 57 by inserting the mounting bar 59 into the yoke 56 and connecting the mounting bar to the yoke with a pin 62 or the like. The hook 96 of the cable 95 from the winch 91 is connected to the bullnose 65 of the dolly 55, and the winch is reeled in so as to begin pulling the trailer onto the ramps of the boat haul vehicle. Once the track wheels 72 of the dolly 55 engage the tracks 76 of the ramps of the vehicle, the jack 85 (FIG. 3) can be raised by turning the crank 86 so that the jack wheel will be lifted upwardly out of the way. In the meantime, the dolly guides the front of the boat trailer along the tracks 76. As the winch 91 continues to draw in its cable, the trailer and boat will be pulled over the ramps of the upper tier of ramps of the trailer 12 and eventually onto the ramps of the upper tier of the tractor 11 with the track wheels 75 guided by the tracks 76 from one ramp to the next and the boat wheels 80 riding on the ramps, until the boat and trailer are properly positioned on the ramps of the tractor 11.

In the meantime, the cable from winch 94 at the rear of the trailer is connected to the rear of the boat trailer. Winch 94 will be operated so as to exert a braking force on the boat and trailer as the boat and trailer move forwardly over the upper tier of ramps.

Once the first boat has been loaded over the tractor, the next boat and its trailer are loaded in a similar manner, by pulling the boats onto the tractor and trailer with winches 92 and 93 and exerting the braking force to the boats and trailers with winch 94. For example, winch 92 will move boat 58b and trailer 57b across the lower tier of ramps, while winch 93 can be used to draw trailers 57c, 57d, 57e and 57f and their respective boats 58c-58f into the trailer 12.

Once the boats and their trailers are loaded onto their respective ramps, the trailers will be tied down with a conventional tie down assemblies 98 (FIG. 3) which are connected to each ramp. Once tied down, the positions of the boats and trailers will be adjusted by moving the ramps with the hydraulic cylinders 38 (FIG. 5), thereby lowering the load within the confines of the tractor and trailer so that the load will be low enough to meet the height limitations, for example 13 feet 6 inches, as required for traveling over interstate highways in the United States.

When the boat haul trailer reaches the delivery site the ramps 20-25 will be adjusted by operating the hydraulic cylinders 38 so as to place the ends of the ramps in alignment with one another, the jumper skids 48, 50 and 51 will be installed, and the tie downs released at the appropriate times. The cable from winch 93 will be connected to trailer 57f (FIG. 2), and because of the inclined angle of the ramp, the trailer and its boat 58f can be moved by gravity down the loading skid 51 by paying out the winch cable so as to off load the boat and trailer. Likewise, boat 58d and its trailer 57d can be off loaded by gravity, also with the use of winch 93 and its cable functioning as a brake to avoid uncontrolled movement.

When off loading boats 58a, 58b, 58c and 58e, the cable from winch 94 will be connected in turn to the rear of each trailer 57a, 57b, 57c and 57e so as to pull each boat and trailer rearwardly through the boat haul vehicle. Winches 91, 92 and 93 will be used as appropriate to apply restraining brake forces to the trailers 57 so as to control the movement thereof.

It will be understood that the foregoing relates only to a preferred embodiment of the present invention, and that numerous changes and modifications may be made therein without departing from the spirit and scope of the invention as set forth in the following claims.

I claim:

1. A boat haul vehicle for hauling over public highways, boats mounted on trailers including road wheels and track wheels, said vehicle comprising
    a chassis,
    wheels supporting said chassis for moving the chassis in a longitudinal direction,
    upright side support frames mounted to opposite sides of said chassis extending parallel to the longitudinal direction,
    a plurality of ramps extending generally parallel to the longitudinal direction and positioned between said side support frames, each of said ramps including substantially flat travel surfaces extending along the lengths of the ramps,
    ramp power means connected to each of said ramps for raising and lowering said ramps with respect to said support frames and for aligning the ends of said ramps with respect to adjacent ramps,
    track members shaped to interfit with said track wheels and mounted to and extending along the lengths of each of said ramps and positioned on each of said ramps so that the track members of one ramp become aligned with the track members of the next adjacent ramp along the length of the vehicle when said ramps are aligned for forming an effectively continuous track from ramp to ramp,
    means for moving the trailers along said ramps, and whereby the trailers are loaded on the ramps by the means for moving said trailers and causing the road wheels to roll on the travel surfaces and the track wheels to guide the trailer along the track members.

2. The boat haul vehicle of claim 1 and wherein said means for moving the trailers comprises winch means mounted to said vehicle and including cable means for connecting to a trailer and pulling a boat and trailer along the ramps.

3. The boat haul vehicle of claim 1 and wherein said means for moving the trailers along the ramps comprises winch means mounted at opposite ends to said vehicle and each said winch means including a cable for connecting to a trailer so that one winch means is used to pull a trailer in one direction along the ramps while the other winch means is used to restrain the movement of the trailer along the ramps.

4. The boat haul vehicle of claim 1 and wherein each trailer includes a support frame, with the road wheels at one end of said support frame and a trailer hitch support mount at the other end of said support frame, and further including a dolly for connection to said trailer hitch support mount, said dolly including a cross beam for connection intermediate its ends to said trailer hitch support mount and the track wheels are mounted to the ends of said cross beam.

5. The boat haul vehicle of claim 1 and wherein said vehicle includes a self-powered tractor, a tow trailer, and a fifth wheel connection for connecting said tow trailer to said tractor.

6. The boat haul vehicle of claim 5 and wherein said tractor and tow trailer each include said side support frames, ramps, and track members, and further including portable ramp members with track members mounted thereon for extending between the ramp members of said tractor and tow trailer for forming an effectively continuous track from the ramps of the tractor to the ramps of the tow trailer so that trailers can move between the ramps and tracks of the tractor and the ramps and tracks of the two trailer.

7. The boat haul vehicle of claim 1 and wherein said ramps are arranged in two vertically disposed layers of ramps and the ramps of one layer are alignable with one another and the ramps of the other layer are alignable with one another.

8. A load carrying vehicle for carrying a plurality of trailers in multiple layers, with each of the trailers including road wheels at one end and a removable dolly at its other end, with the dolly including track wheels, said load carrying vehicle comprising:
    side frames mounted parallel to each other and defining a load space therebetween,
    a plurality of ramps positioned in said load space and movably mounted to said side frames, said ramps each including a substantially flat road wheel surfaces extending along the length of the ramp for receiving the road wheels of the trailers and track means extending along the length of the ramp and shaped to guide the track wheels of the dolly along the length of the ramp,
    ramp power means for raising and lowering said ramps and for aligning the ends of said ramps to place the road wheel surfaces and the track means of adjacent ramps in alignment to form effectively continuous road wheel surfaces and effectively continuous track means from ramp to ramp, and
    power means mounted to said vehicle for moving said trailers along said ramps,
    whereby the trailers are moved along the ramps by the power means with the road wheels rolling along the flat road wheel surfaces and the track wheels of the dollies rolling along the track means.

9. The load carrying vehicle of claim 8 and wherein said means for moving said trailers along said ramps comprise a winch with a cable connectable to the trailers for pulling the trailers along said ramps.

10. The load carrying vehicle of claim 8 and wherein said means for moving said trailers along said ramps comprise winch means at opposite ends of said vehicle with one winch means arranged to pull a trailer in one direction along said ramps and with another winch means arranged to restrain the movement of a trailer along said ramps.

* * * * *